(No Model.)
W. C. THOMAS.
APPARATUS EMPLOYED IN WALLING EXCAVATIONS.
No. 582,028. Patented May 4, 1897.
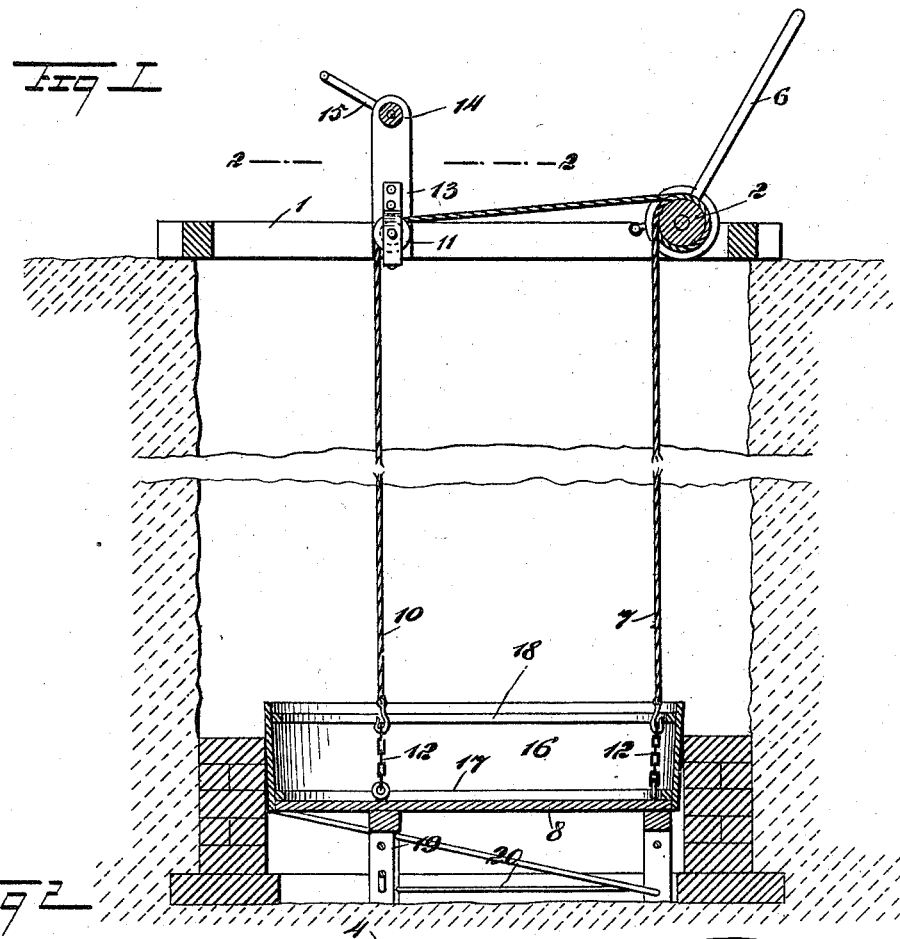
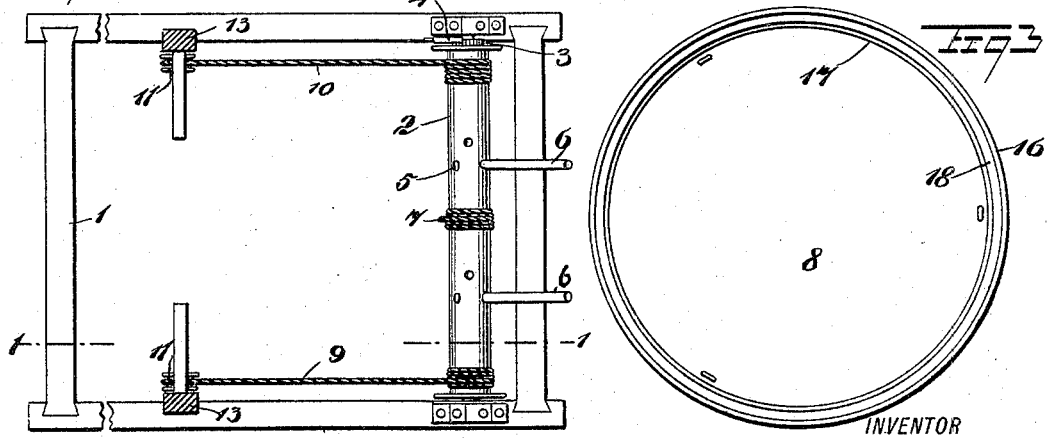
WITNESSES:
INVENTOR
W. C. Thomas
BY Munn & Co.
ATTORNEYS.

UNITED STATES PATENT OFFICE.

WILLIAM C. THOMAS, OF FOUNTAIN, KANSAS.

APPARATUS EMPLOYED IN WALLING EXCAVATIONS.

SPECIFICATION forming part of Letters Patent No. 582,028, dated May 4, 1897.

Application filed December 11, 1896. Serial No. 615,279. (No model.)

*To all whom it may concern:*

Be it known that I, WILLIAM C. THOMAS, of Fountain, in the county of Osage and State of Kansas, have invented new and useful Improvements in Apparatus Employed in Walling Excavations, of which the following is a full, clear, and exact description.

This invention relates to devices employed in walling wells, cisterns, root-pits, silos, and the like; and the object is to provide a device that may be lowered and raised in the pit, as desired, to form a gage around which the wall may be built, and also providing a platform for supporting the workmen and the loose material employed in building the wall.

I will describe an apparatus embodying my invention and then point out the novel features in the appended claims.

Reference is to be had to the accompanying drawings, forming a part of this specification, in which similar characters of reference indicate corresponding parts in all the views.

Figure 1 is a vertical section on the line 1 1 of Fig. 2 of a device embodying my invention. Fig. 2 is a partial plan and partial section on the line 2 2 of Fig. 1, and Fig. 3 is a plan view of a platform and gaging device employed.

Referring to the drawings, 1 designates a frame designed to rest upon the ground at the top of the pit. Journaled in this frame 1 is a windlass 2, having at one end a ratchet-wheel 3, engaged by a dog 4 to prevent a reverse movement of the windlass. This windlass may be turned by any suitable means. I have here shown it as provided with holes 5, into which a bar 6 may be inserted, the said bar forming a lever by means of which the windlass may be rotated.

From the central portion of the windlass 2 a rope 7 extends downward to a connection with a platform 8, and from the ends of this windlass 2 ropes 9 and 10 extend over pulleys 11, mounted on the frame 1, and downward to a connection with the platform 8. Preferably the lower ends of the ropes 7, 9, and 10 will be provided with hooks, which engage the upper links of chains 12', attached to eyes on the platform 8.

The three hoisting-ropes, it will be noted, are arranged as to their connection with the platform at the three apexes of a triangle. Therefore it is evident that the platform may be raised and lowered without tilting. From the frame 1 standards 13 extend upward, and journaled in these standards is a windlass 14, provided with a crank 15 at one end. This windlass 14 is to be employed in lowering material for the wall.

Removably mounted on the platform 8 is a circular gage-casing 16. This gage-casing 16 is slightly smaller in diameter at its lower end than at its top, and this lower portion engages loosely around the platform and is held in place by means of an interior flange 17, resting on the top of the platform 8. The upper portion of the gage 16 is provided with an interior annular flange 18, under which suitable stakes may be engaged when it is desired to raise and lower the gage-frame—that is, by connecting a rope extended from the windlass 14 with the said casing.

The platform 8 is provided with three or more legs 19, connected together by brace-rods 20. The device will not be put in use until the wall shall have been built a certain distance upward in the pit. Then the whole device may be lowered to the proper position and the wall continued around it.

Having thus described my invention, I claim as new and desire to secure by Letters Patent—

1. A device for the purpose described, comprising a frame adapted to rest on the ground at the upper end of the pit, a windlass mounted to rotate in said frame, a ratchet-wheel on one end of said windlass, a dog pivoted to the frame and engaging the said ratchet-wheel, means for turning the windlass, a platform, three ropes extended from the windlass to connections with the platform, pulleys over which two of said ropes extend, and a gage-frame removably mounted on the platform, substantially as specified.

2. A device for the purpose described, comprising a frame designed to rest upon the ground, a windlass mounted to rotate in said frame and provided with holes for the insertion of a turning lever, a platform, legs on the said platform, a rope extended from the windlass to a connection with the platform, pulleys mounted on the frame, ropes extended from the windlass over said pulleys to connections with said platform, a lowering-windlass mounted on said frame, and a gage-frame loosely surrounding the platform, substantially as specified.

WILLIAM C. THOMAS.

Witnesses:
ARTHUR WAETZIG,
FRANK R. BARTLETT.